(12) United States Patent
Zhu et al.

(10) Patent No.: US 10,782,866 B2
(45) Date of Patent: *Sep. 22, 2020

(54) CONTROLLING METHOD AND DEVICE FOR SLIDER CONTROL, AND SLIDER SELECTOR

(71) Applicant: Alibaba Group Holding Limited, George Town (KY)

(72) Inventors: Xingmin Zhu, Hangzhou (CN); Xiaoqing Lin, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 1 day.

This patent is subject to a terminal disclaimer.

(21) Appl. No.: 16/234,467

(22) Filed: Dec. 27, 2018

(65) Prior Publication Data
US 2019/0155491 A1  May 23, 2019

Related U.S. Application Data

(63) Continuation of application No. PCT/CN2017/088548, filed on Jun. 16, 2017.

(30) Foreign Application Priority Data

Jun. 28, 2016 (CN) .......................... 2016 1 0494357

(51) Int. Cl.
*G06F 3/0484* (2013.01)
*G06F 3/0482* (2013.01)
(Continued)

(52) U.S. Cl.
CPC ........ *G06F 3/04847* (2013.01); *G06F 3/0482* (2013.01); *G06F 3/0486* (2013.01); *G06F 3/0488* (2013.01)

(58) Field of Classification Search
USPC .......................................... 345/173
See application file for complete search history.

(56) References Cited

U.S. PATENT DOCUMENTS 5,867,678 A * 2/1999 Amro .................... G06F 16/904
715/786
5,874,961 A * 2/1999 Bates .................. G06F 3/04855
715/786
(Continued)

FOREIGN PATENT DOCUMENTS

CN 101980136 2/2011
CN 103383621 11/2013
(Continued)

OTHER PUBLICATIONS

European Extended Search Report in European Patent Application No. 17819112.8, dated May 22, 2019, 10 pages.
(Continued)

*Primary Examiner* — Chineyere D Wills-Burns
(74) *Attorney, Agent, or Firm* — Fish & Richardson P.C.

(57) ABSTRACT

An instruction associated with a first sliding control is received, where the first sliding control is located on a first side of a second sliding control, and where the received instruction instructs the first sliding control to be slid to a second side of the second sliding control. The first sliding control is slid to the second side of the second sliding control in response to receiving the instruction.

21 Claims, 19 Drawing Sheets

(51) Int. Cl.
*G06F 3/0486* (2013.01)
*G06F 3/0488* (2013.01)
*G06F 3/0485* (2013.01)

(56) References Cited

U.S. PATENT DOCUMENTS

| | | | | |
|---|---|---|---|---|
| 6,204,846 | B1* | 3/2001 | Little | G06F 3/04855 |
| | | | | 715/784 |
| 7,562,310 | B2 | 7/2009 | Champion et al. | |
| 8,018,432 | B1* | 9/2011 | Chakravarty | G11B 27/105 |
| | | | | 345/156 |
| 8,826,192 | B1* | 9/2014 | Rinckes | G06F 3/04847 |
| | | | | 345/173 |
| 2005/0094014 | A1* | 5/2005 | Haas | H04N 1/00458 |
| | | | | 348/333.01 |
| 2008/0165141 | A1* | 7/2008 | Christie | G06F 3/0482 |
| | | | | 345/173 |
| 2008/0256489 | A1 | 10/2008 | Maurer et al. | |
| 2009/0241072 | A1* | 9/2009 | Chaudhri | G06F 3/017 |
| | | | | 715/863 |
| 2009/0282362 | A1* | 11/2009 | Matsumoto | G06F 3/04855 |
| | | | | 715/787 |
| 2010/0306704 | A1 | 12/2010 | Cotterill | |
| 2011/0025924 | A1* | 2/2011 | Price | H04N 21/4438 |
| | | | | 348/734 |
| 2011/0167347 | A1 | 7/2011 | Joo et al. | |
| 2012/0280922 | A1* | 11/2012 | Lee | G06F 3/0485 |
| | | | | 345/173 |
| 2013/0159922 | A1* | 6/2013 | Borkowski | G06F 3/04855 |
| | | | | 715/786 |
| 2013/0239057 | A1 | 9/2013 | Ubillos et al. | |
| 2014/0007011 | A1* | 1/2014 | Allen | G06F 3/0483 |
| | | | | 715/833 |
| 2014/0258854 | A1* | 9/2014 | Li | H04N 21/4858 |
| | | | | 715/702 |
| 2014/0337799 | A1 | 11/2014 | Zhong et al. | |
| 2016/0054896 | A1* | 2/2016 | Takahashi | G06F 3/0418 |
| | | | | 715/810 |
| 2018/0329461 | A1* | 11/2018 | Hernandez Santisteban | |
| | | | | G06F 1/1677 |
| 2020/0125248 | A1 | 4/2020 | Zhu et al. | |

FOREIGN PATENT DOCUMENTS

| | | |
|---|---|---|
| CN | 103793125 | 5/2014 |
| CN | 104142789 | 11/2014 |
| CN | 104350495 | 2/2015 |
| CN | 104935725 | 9/2015 |
| TW | 201409346 | 3/2014 |
| TW | 201426571 | 7/2014 |

OTHER PUBLICATIONS

Gocalf.com [online], "iOS Custom Range Slider Control," Last Updated on Dec. 2012, [Retrieved on May 24, 2019], Retrieved from: URL<http://www.gocalf.com/blog/iphone-dev-range-slider.html>, 18 pages (with Machine English Translation).
International Preliminary Report on Patentability in International Application No. PCT/CN2017/088548 dated Jan. 1, 2019; 8 pages.
International Search Report by the International Searching Authority issued in International Application No. PCT/CN2017/088548 dated Sep. 18, 201713 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

CONTROLLING METHOD AND DEVICE FOR SLIDER CONTROL, AND SLIDER SELECTOR

CROSS-REFERENCE TO RELATED APPLICATIONS

This application is a continuation of PCT Application No. PCT/CN2017/088548, filed on Jun. 16, 2017, which claims priority to Chinese Patent Application No. 201610494357.9, filed on Jun. 28, 2016, and each application is hereby incorporated by reference in its entirety.

TECHNICAL FIELD

The present application relates to the field of computer technologies, and in particular, to a controlling method and a controlling device for a sliding control, and a slider selector.

BACKGROUND

With rapid development of computer technologies and Internet technologies, there are more controls on web pages. These controls bring various page presentation forms, and provide convenience for interaction between users and pages.

A slider selector is one of frequently-used controls. A slider selector generally includes one sliding track and two slider controls. The sliding track is used to specify a value interval, and a user can select a value subinterval from the value interval by sliding the slider controls on the sliding track. A horizontal sliding track is used as an example. There are two slider controls: a left slider control and a right slider control. A value subinterval corresponding to a track part between the left slider control and the right slider control can be determined as a value subinterval currently selected by a user.

However, in the existing technology, the left slider control can slide only on a left side of the right slider control, and the right slider control can slide only on a right side of the left slider control. Due to this limitation, the slider selector is inconvenient to be used in some scenarios.

For example, assume that current locations of the left slider control and the right slider control on the sliding track overlap, and the right slider control covers the left slider control. If a user wants to select a value subinterval on a left side of the left slider control and the right slider control, the user taps and holds the locations of the left slider control and the right slider control, and drags the left slider control and the right slider control leftward. However, the user actually drags the right slider control. In this case, the right slider control cannot be slid to the left side of the left slider control through the drag operation. As a result, the user can only drag the right slider control rightward, drag the left slider control leftward to a location corresponding to a left endpoint value of a value subinterval that is to be selected, and then drag the right slider control leftward to a location corresponding to a right endpoint value of the value subinterval that is to be selected. Therefore, operations are cumbersome, and it is inconvenient to use the slider selector.

SUMMARY

Implementations of the present application provide a controlling method and a controlling device for a sliding control, and a slider selector, to alleviate a problem in the existing technology that a slider selector is inconvenient to be used in some scenarios.

The following technical solutions are used in the implementations of the present application:

A controlling method for a sliding control according to an implementation of the present application includes: receiving a sliding instruction for a first sliding control, where the first sliding control is located on a second sliding control or on one side of the second sliding control; and sliding the first sliding control to the other side of the second sliding control when it is determined that the sliding instruction is used to instruct to slide the first sliding control to the other side of the second sliding control.

A controlling device for a sliding control according to an implementation of the present application includes: a receiving module, configured to receive a sliding instruction for a first sliding control, where the first sliding control is located on a second sliding control or on one side of the second sliding control; and a sliding module, configured to slide the first sliding control to the other side of the second sliding control when it is determined that the sliding instruction is used to instruct to slide the first sliding control to the other side of the second sliding control.

A slider selector according to an implementation of the present application includes a sliding track, and a first slider control and a second slider control that are located on the sliding track, where the first slider control is located on the second slider control or on one side of the second slider control.

The slider selector slides the first slider control to the other side of the second slider control along the sliding track when it is determined that a received sliding instruction for the first slider control is used to instruct to slide the first slider control to the other side of the second slider control.

At least one of the previous technical solutions used in the implementations of the present application can achieve the following beneficial effects: The first sliding control and the second sliding control can be slider controls, and limitations on the relative locations of the slider controls in the existing technology can be lifted, so that the slider controls can be exchanged. The first sliding control can be slid not only to one side of the second sliding control, but also to the other side of the second sliding control. Therefore, in the scenario in the background, user operations can be reduced, and it is more convenient to use the slider selector, so that the problem in the existing technology can be partially or completely resolved.

BRIEF DESCRIPTION OF DRAWINGS

The accompanying drawings described here are intended to provide a further understanding of the present application, and constitute a part of the present application. The illustrative implementations of the present application and descriptions of the illustrative implementations are intended to describe the present application, and do not constitute limitations on the present application. In the accompanying drawings.

DESCRIPTION OF IMPLEMENTATIONS

To make the objectives, technical solutions, and advantages of the present application clearer, the following clearly and comprehensively describes the technical solutions of the present application with reference to specific implementations of the present application and the accompanying drawings. Apparently, the described implementations are merely some rather than all of the implementations of the present application. All other implementations obtained by a person of ordinary skill in the art based on the implementations of the present application without creative efforts shall fall within the protection scope of the present application.

The solutions of the present application can involve the use of two or more sliding controls. A scenario of more than two sliding controls can be split into a plurality of sub-scenarios of two sliding controls, and the solutions of the present application can be separately implemented in each sub-scenario. Therefore, the following mainly gives description based on a scenario of two sliding controls. For ease of description, the two sliding controls are respectively referred to as a first sliding control and a second sliding control. The first sliding control and the second sliding control can be the same control, or can be different controls.

It is worthwhile to note that the sliding control can be a complete control, or can be a part of a complete control. For example, the first sliding control and the second sliding control can be different parts of the same slider selector. The left slider control and the right slider control mentioned in the background can each be a separate sliding control, etc. In the present application, all first sliding controls can be replaced with second sliding controls, and all original second sliding controls can be replaced with first sliding controls.

Figure 1:
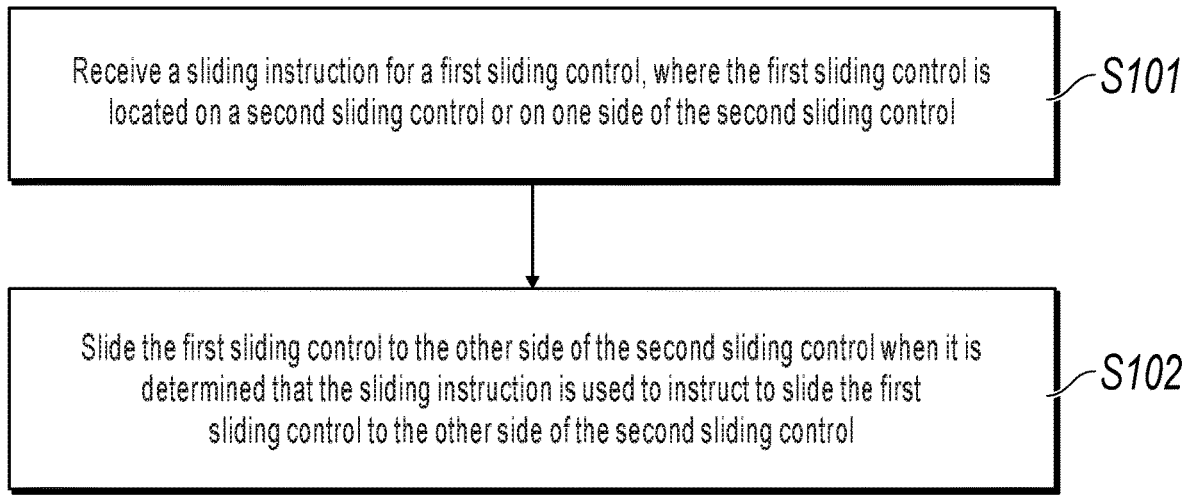
FIG. 1 is a schematic flowchart illustrating a controlling method for a sliding control, according to an implementation of the present application.

FIG. 1 is a schematic flowchart illustrating a controlling method for a sliding control, according to an implementation of the present application. The method in FIG. 1 can be performed by a device on which the sliding control is located, and the sliding control can be specifically located on a page of an application program or an operating system installed in the device. The device includes but is not limited to a mobile phone, a tablet computer, a smartwatch, an in-vehicle mobile station, a personal computer, a medium-sized computer, a computer cluster, etc. A device performing the method constitutes no limitation on the present application.

A procedure in FIG. 1 can include the following steps.

S101. Receive a sliding instruction for a first sliding control, where the first sliding control is located on a second sliding control or on one side of the second sliding control.

In this implementation of the present application, the first sliding control and the second sliding control can be slider controls, or can be slideable controls other than the slider control, for example, sliding handle controls that are configured to select a page element displayed on a page on which the first sliding control and the second sliding control are located.

Use of the first sliding control and the second sliding control is not limited in the present application. The first sliding control and the second sliding control can be configured to select a value interval or select a value subinterval from a determined value interval, or can be configured to select a text, or can be configured as a drawing tool for color modulation of an image, etc.

In this implementation of the present application, the sliding instruction can be generated based on a drag operation performed on the first sliding control. For a touchscreen device, a user can directly drag the first sliding control on a touchscreen by using a finger. For a non-touchscreen device, the user can drag the first sliding control by using an input tool such as a mouse or a touchpad. After detecting the drag operation of the user, the device can generate a corresponding sliding instruction, and transmit the instruction to a function module configured to control the first sliding control, and then step S101 can be triggered. The function module configured to control the first sliding control can be a part of the first sliding control, or can be a module outside the first sliding control.

The sliding instruction can alternatively be generated by simulating a drag operation on the first sliding control based on an automation script. In this case, the user merely needs to execute the automation script to trigger step S101, without a need to perform a drag operation.

S102. Slide the first sliding control to the other side of the second sliding control when it is determined that the sliding instruction is used to instruct to slide the first sliding control to the other side of the second sliding control.

In this implementation of the present application, the one side of the second sliding control can be one of at least two directions in which the second sliding control can be slid. Correspondingly, the other side of the second sliding control can be the other one of the at least two directions in which the second sliding control can be slid. For example, in the scenario described in the background part of the present disclosure, the sliding control can be a slider control. When the slider control is slid on a horizontal sliding track, one side of the slider control is the left side of the slider control, and the other side of the slider control is the right side of the slider control. Alternatively, one side of the slider control is the right side of the slider control, and the other side of the slider control is the left side of the slider control.

The directions that the second sliding control can be slid to are not limited in the present application. There can be two or more sliding directions. An area in which the second sliding control can be slid is not limited in the present application, and there may be one or more predetermined sliding tracks, or there may be one or more areas that include no sliding track. A shape of the track on which the second sliding control can be slid is not limited in the present application, and the track can be a horizontal track, a vertical track, a curve track, etc.

In comparison with the existing technology that relative locations of slider controls are limited (for example, a location of a sliding control is used to limit, in real time, an area in which another sliding control can be slid), in this implementation of the present application, this limitation can be reduced or even lifted. Therefore, sliding controls can be freely slid in a same predetermined area without being limited by one another, and a real-time location of each sliding control may not limit an area in which another sliding control can be slid. Alternatively, even if there is a certain limitation between the sliding controls (for example, a distance between the sliding controls cannot exceed a specified threshold), at least the action in step S102 can still be implemented.

For example, in the scenario described in the background, when the solutions of the present application are used, the left slider control and the right slider control can be exchanged. Specifically, the left slider control can be slid from a location or a left side of the right slider control to a right side of the right slider control, and after the left slider control is slid to the right side of the right slider control, the original left slider control becomes a right slider control, and the original right slider control becomes a left slider control. Likewise, the right slider control can also be slid from a location or a right side of the left slider control to a left side of the left slider control.

In this implementation of the present application, specific implementations to lift the aforementioned limitation are not limited, and can depend on how the limitation is generated in the existing technology. For example, in a jQuery-based slider selector, an array including two elements is predetermined. The $0^{th}$ element of the array represents a value corresponding to the left slider control, the first element of the array represents a value corresponding to the right slider control, and the value of the first element is always limited to be not less than the value of the $0^{th}$ element. However, in the solutions of the present application, the array can still be used without the limitation, or the array can even not be used. Instead, two mutually independent variables are respectively used to represent a value corresponding to the first sliding control and a value corresponding to the second sliding control. Therefore, it is equivalent to lifting the limitation. The two listed specific implementation methods for lifting the limitation are merely examples, and constitute no limitation on the present application. Alternatively, the limitation can be lifted by using another specific implementation method based on an actual situation.

In the previous method, the first sliding control and the second sliding control can be slider controls, and the limitation on the relative locations of the slider controls in the existing technology can be lifted, so that the slider controls can be exchanged. The first sliding control can be slid not only to one side of the second sliding control, but also to the other side of the second sliding control. Therefore, in the scenario previously described in the background, user operations can be reduced, and it is more convenient to use the slider selector, so that the problem in the existing technology can be partially or completely resolved.

Based on the previous method, an implementation of the present application further provides some specific implementation solutions and extended solutions of the previous method. Descriptions are given below.

In this implementation of the present application, step S102 can have two implementations.

In a first implementation, step S102 of sliding the first sliding control to the other side of the second sliding control can specifically include sliding the first sliding control to the other side of the second sliding control by passing through a location of the second sliding control.

For example, the first sliding control can be directly slid to the other side of the second sliding control by crossing the second sliding control. The first sliding control and the second sliding control can be located on a same sliding track, or not on the sliding track, but in an area other than the sliding track in which sliding can be performed.

In a second implementation, step S102 of sliding the first sliding control to the other side of the second sliding control can specifically include sliding the first sliding control to the other side of the second sliding control by bypassing the location of the second sliding control, provided that the first sliding control is located on one side of the second sliding control, instead of on the second sliding control.

For example, when the first sliding control is slid to a location near the second sliding control, the first sliding control can automatically bypass the second sliding control and then continue sliding. In this process, the first sliding control and the second sliding control do not overlap.

In terms of operation experience of a user, in both the previous two methods, user operations can be reduced, and operation processes are not interrupted, thereby helping improve the operation processes. Further, the first method further helps reduce a sliding distance of the first sliding control, thereby reducing operation time. For example, the first sliding control can be straight slid (in a shortest sliding distance) from one side of the second sliding control to the other side of the second sliding control, by using a straight line between the first sliding control and the second sliding control and an extended line of the straight line as a sliding track of the first sliding track. The second method further helps avoid a problem that a user cannot be aware of overlapping of the locations of the sliding controls in a timely manner. For example, in a scenario of more than two sliding controls, in the existing technology, a user is unable to be aware that locations of two of the sliding controls overlap, and may consider that there is only one sliding control. In the second method, the locations of the sliding controls do not overlap, and therefore, this problem can be alleviated.

In practice, to help control an area in which a sliding control can be slid, a sliding track is usually disposed, and the sliding control can be slid only on the sliding track. The solutions of the present application are further described for a case with a sliding track.

In this implementation of the present application, the first sliding control and the second sliding control can be located on a same sliding track. In this case, for step S101 and step S102, one side of the second sliding control includes a track part that is of the sliding track and that is located on one side of the location of the second sliding control, and the other side of the second sliding control includes a track part that is of the sliding track and that is located on the other side of the location of the second sliding control.

Further, step S102 of sliding the first sliding control to the other side of the second sliding control by passing through the location of the second sliding control can specifically include sliding the first sliding control to the other side of the second sliding control along the sliding track by passing through the location of the second sliding control.

It is worthwhile to note that, on a loop sliding track such as a ring sliding track, the first sliding control can be slid to the other side of the second sliding control in an opposite direction without passing through the location of the second sliding control.

In this implementation of the present application, as described above, the sliding control can have different functions. One of the most frequently used functions is the function described in the background, to be specific, for selecting a value subinterval from a determined value interval. In this case, the sliding track is configured to specify a value interval, and the first sliding control and the second sliding control are configured to select a value subinterval from the value interval.

An attribute corresponding to the value interval is not limited in the present application. For example, the attribute corresponding to the value interval can be a price, a time, a distance, etc. The value interval can be a consecutive interval, or can be an inconsecutive interval (for example, a discrete interval), and each value in the value interval can correspond to at least one location on the sliding track.

In this implementation of the present application, after step S102 of sliding the first sliding control to the other side of the second sliding control, the following can be further performed: determining, based on a location of the first sliding control on the sliding track obtained after sliding and the location of the second sliding control on the sliding track, the value subinterval selected from the value interval by using the first sliding control and the second sliding control.

Generally, the selected value subinterval is a value subinterval corresponding to a track part between the first sliding control and the second sliding control, and the location of the first sliding control and the location of the second sliding control are separately corresponding to one interval endpoint value of the value subinterval.

It is worthwhile to note that the previous description is merely an example of a specific implementation that can be used to determine the selected value subinterval, instead of a limitation on the present application, and the selected value subinterval can be determined in another way. For example, a value subinterval corresponding to a track part between an endpoint of the value interval and the location of the first sliding control, and/or a value subinterval corresponding to a track part between the endpoint and the location of the second sliding control are/is determined as the selected value subinterval.

In this implementation of the present application, as described above, the first sliding control and the second sliding control are slider controls. Styles (for example, a color, a shape, a texture, or a pattern) of the slider control and the sliding track are not limited in the present application.

In this implementation of the present application, in addition to the problem previously described in the background, a similar problem can also be alleviated by using the solutions of the present application. Descriptions are given below.

For a touchscreen device, in many applications, a user can select a page element (such as a text or a picture) displayed on a page by using a left sliding handle control and a right sliding handle control that appear after the user presses and holds the page. The user can drag the left sliding handle control or the right sliding handle control to slide the left sliding handle control or the right sliding handle control on the page, and a page element displayed on a part (which can have one or more rows) between a location of the left sliding handle control and a location of the right sliding handle control can be determined as a selected page element.

However, in the existing technology, similar to the problem of the slider selector, in a same row, the right sliding handle control cannot be slid to a left side of the left sliding handle control, and the left slide handle control cannot be slid to a right side of the right sliding handle control. Therefore, it is inconvenient for the user to use the left sliding handle control and the right sliding handle control. In the solutions of the present application, the first sliding control and the second sliding control can be sliding handle controls configured to select a page element displayed on a page on which the first sliding control and the second sliding control are located. In this case, either of the two sliding handle controls can be slid from one side of the other sliding handle control to the other side of the other sliding handle control. Therefore, the problem in the existing technology can be partially or completely resolved.

Further, in this case, after step S102 of sliding the first sliding control to the other side of the second sliding control, the following can be further performed: determining, based on a location of the first sliding control obtained after sliding and the location of the second sliding control, the page element selected by using the first sliding control and the second sliding control.

Figure 2:
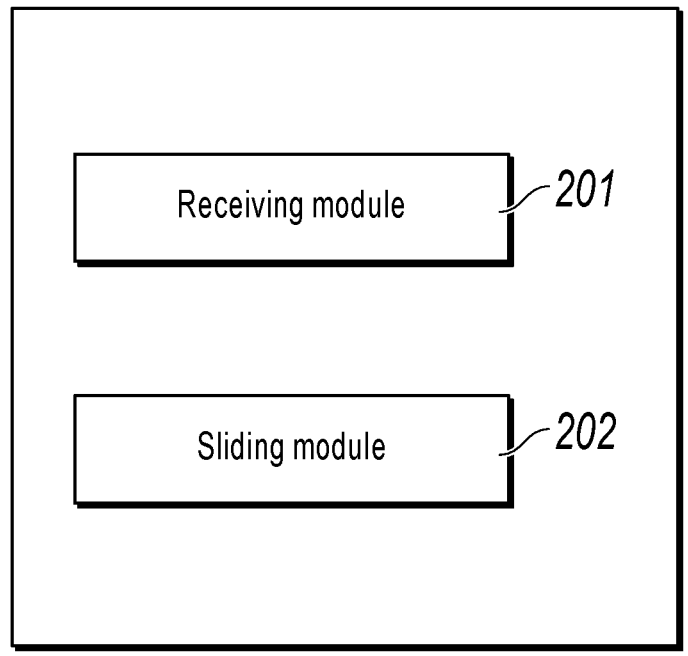
FIG. 2 is a schematic structural diagram illustrating a controlling device for a sliding control, according to an implementation of the present application.

The controlling method for a sliding control provided in the implementation of the present application is described above. As shown in FIG. 2, based on the same idea, an implementation of the present application further provides a corresponding controlling device for a sliding control.

FIG. 2 is a schematic structural diagram illustrating a controlling device for a sliding control, according to an implementation of the present application. The device includes: a receiving module 201, configured to receive a sliding instruction for a first sliding control, where the first sliding control is located on a second sliding control or on one side of the second sliding control; and a sliding module 202, configured to slide the first sliding control to the other side of the second sliding control when it is determined that the sliding instruction is used to instruct to slide the first sliding control to the other side of the second slider.

Optionally, the sliding instruction is generated based on a drag operation performed on the first sliding control.

Optionally, the sliding module 202 slides the first sliding control to the other side of the second sliding control by passing through a location of the second sliding control.

Optionally, the first sliding control and the second sliding control are located on a same sliding track.

One side of the second sliding control includes a track part that is of the sliding track and that is located on one side of a location of the second sliding control, and the other side of the second sliding control includes a track part that is of the sliding track and that is located on the other side of the location of the second sliding control.

Optionally, the sliding module 202 slides the first sliding control to the other side of the second sliding control along the sliding track by passing through the location of the second sliding control.

Optionally, the sliding track is configured to specify a value interval.

The first sliding control and the second sliding control are configured to select a value subinterval from the value interval.

Optionally, the device further includes: a first determining module 203, configured to determine, based on a location of the first sliding control on the sliding track obtained after sliding and the location of the second sliding control on the sliding track, the value subinterval selected from the value interval by using the first sliding control and the second sliding control after the sliding module slides the first sliding control to the other side of the second sliding control.

Optionally, the first sliding control and the second sliding control are slider controls.

Optionally, the first sliding control and the second sliding control are sliding handle controls configured to select a page element displayed on a page on which the first sliding control and the second sliding control are located.

The device further includes a second determining module 204, configured to determine, based on a location of the first sliding control obtained after sliding and the location of the second sliding control, the page element selected by using the first sliding control and the second sliding control after the sliding module slides the first sliding control to the other side of the second sliding control.

The device in FIG. 2 can be specifically located on a device on which the sliding control is located.

The device provided in the present application is in a one-to-one mapping relationship with the method provided in the present application. Therefore, the device has beneficial technical effects similar to those of the method. Because the beneficial technical effects of the method have been described in detail above, the beneficial technical effects of the device are not described here.

Further, based on the same idea, an implementation of the present application further provides a slider selector. The slider selector is an instance of the device in FIG. 2 in an application scenario (a sliding control is specifically a slider control), and the method in FIG. 1 can be performed by using the slider selector. Details are shown in FIG. 3.

Figure 3:
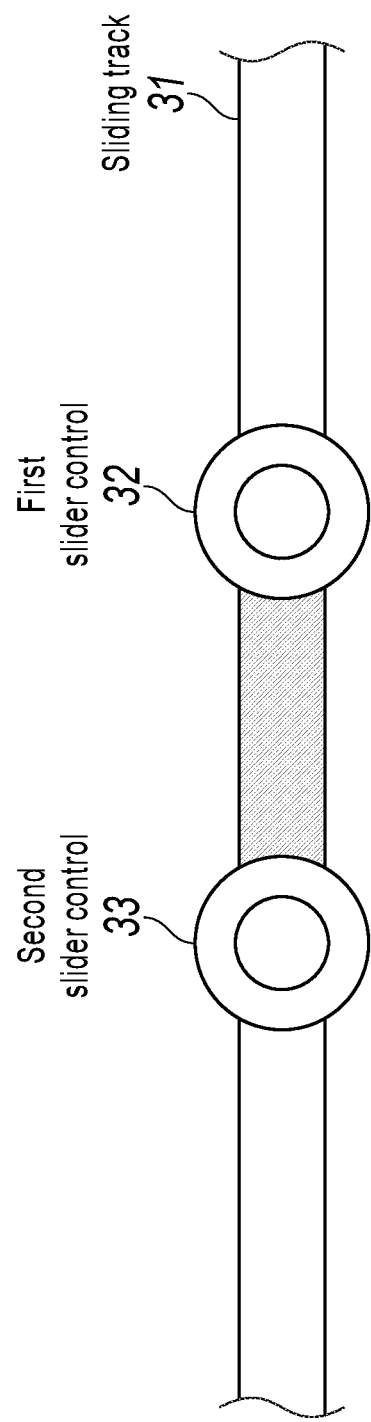
FIG. 3 is a schematic diagram illustrating a user interface of a slider selector, according to an implementation of the present application.

FIG. 3 is a schematic diagram illustrating a user interface of a slider selector, according to an implementation of the present application. The slider selector in FIG. 3 includes a sliding track 31, and a first slider control 32 and a second slider control 33 that are located on the sliding track. The first slider control 32 is located on the second slider control 33 or on one side of the second slider control 33.

The slider selector slides the first slider control 32 to the other side of the second slider control 33 along the sliding track when it is determined that a received sliding instruction for the first slider control 32 is used to instruct to slide the first slider control 32 to the other side of the second slider control 33.

Optionally, the sliding instruction is generated based on a drag operation performed on the first slider control.

Optionally, one side of the second slider control 33 includes a track part that is of the sliding track and that is located on one side of a location of the second slider control 33, and the other side of the second slider control 33 includes a track part that is of the sliding track and that is located on the other side of the location of the second slider control 33.

Optionally, the slider selector slides the first slider control 32 to the other side of the second slider control 33 along the sliding track by passing through the location of the second slider control 33 when it is determined that the received sliding instruction for the first slider control 32 is used to instruct to slide the first slider control 32 to the other side of the second slider control 33.

Optionally, the sliding track is configured to specify a value interval.

The first slider control 32 and the second slider control 33 are configured to select a value subinterval from the value interval.

Optionally, the slider selector determines, based on a location of the first slider control 32 on the sliding track obtained after sliding and the location of the second slider control 33 on the sliding track, the value subinterval selected from the value interval by using the first slider control 32 and the second slider control 33 after sliding the first slider control 32 to the other side of the second slider control 33.

By using the slider selector, a limitation on relative locations of the slider controls in the existing technology can be lifted, so that the slider controls can be exchanged. The first slider control can be slid not only to one side of the second slider control, but also to the other side of the second slider control. Therefore, in the scenario in the background, operations of a user can be reduced, and it is more convenient to use the slider selector, so that the problem in the existing technology can be partially or completely resolved.

User interface appearances of the slider selector provided in this implementation of the present application and the slider selector in the existing technology can be the same, or can be different. In either case, operation effects of the slider selector provided in this implementation of the present application and the slider selector in the existing technology are different, and the problem in the existing technology can be partially or completely resolved just because of the difference. To more intuitively describe the difference, descriptions are given below with reference to related schematic diagrams, including FIG. 4, FIG. 5a to FIG. 5c, FIG. 6a to FIG. 6d, and FIG. 7a to FIG. 7g.

Figure 4:
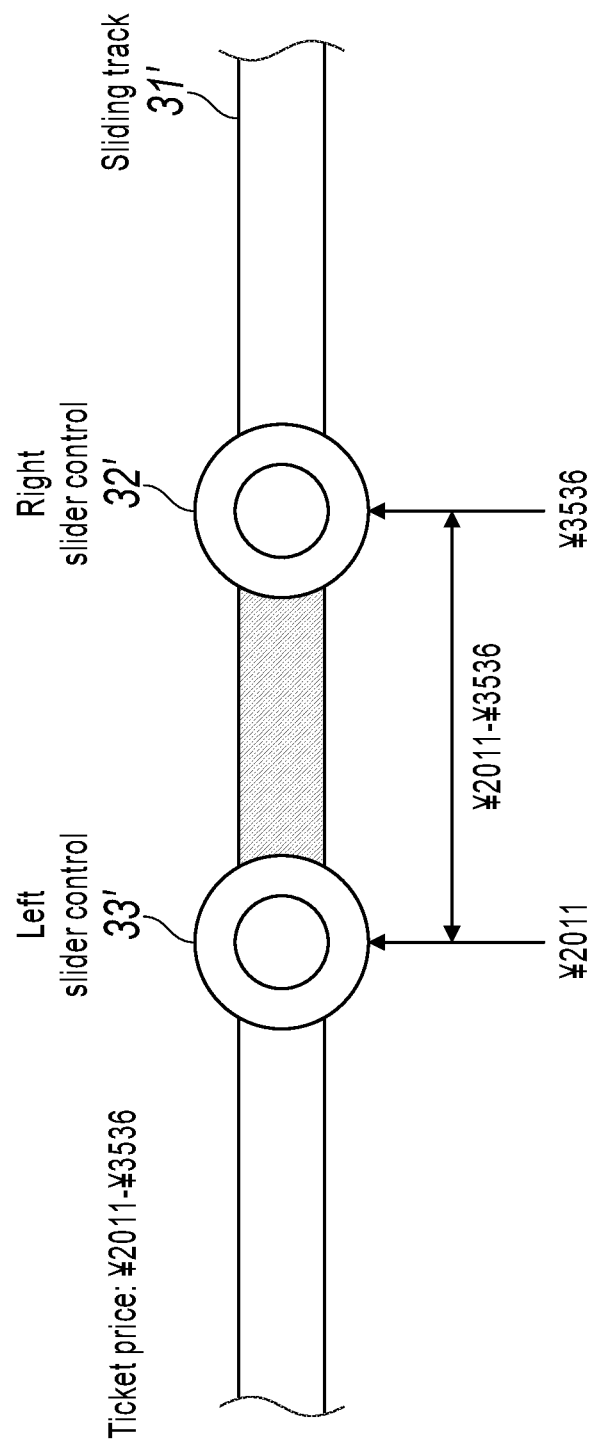
FIG. 4 is a schematic diagram illustrating a user interface of a slider selector, according to the existing technology.

FIG. 4 is a schematic diagram illustrating a user interface of a slider selector, according to the existing technology. For ease of viewing, appearances of the user interface in FIG. 4 and the user interface in FIG. 3 are the same. The slider selector in FIG. 4 includes a sliding track 31', a right slider control 32', and a left slider control 33'.

In FIG. 4, the sliding track 31' is configured to specify a ticket price interval, and a current ticket price subinterval selected by using the left slider control 33' and the right slider control 32' is [¥2011-¥3536], that is, a price subinterval corresponding to the dark-colored part of the sliding track 31'. A ticket price corresponding to a location of the left slider control 33' is ¥2011, and a ticket price corresponding to a location of the right slider control 32 is ¥3536.

Figure 5A:
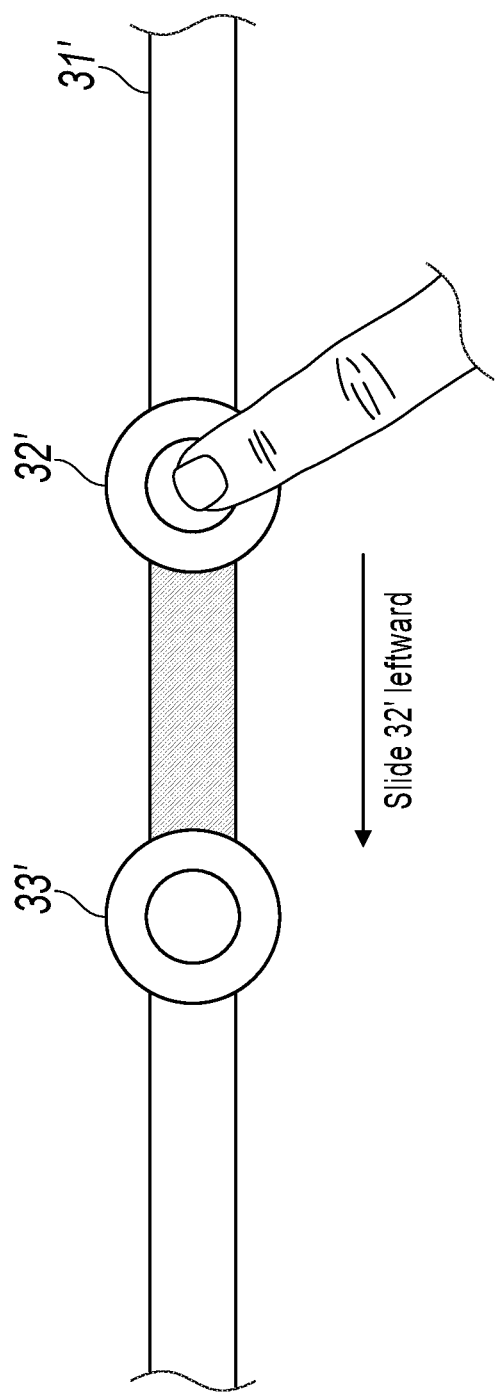
FIG. 5a is a schematic diagram illustrating a first state corresponding to a controlling procedure of a slider control, according to the existing technology.
Figure 5B:
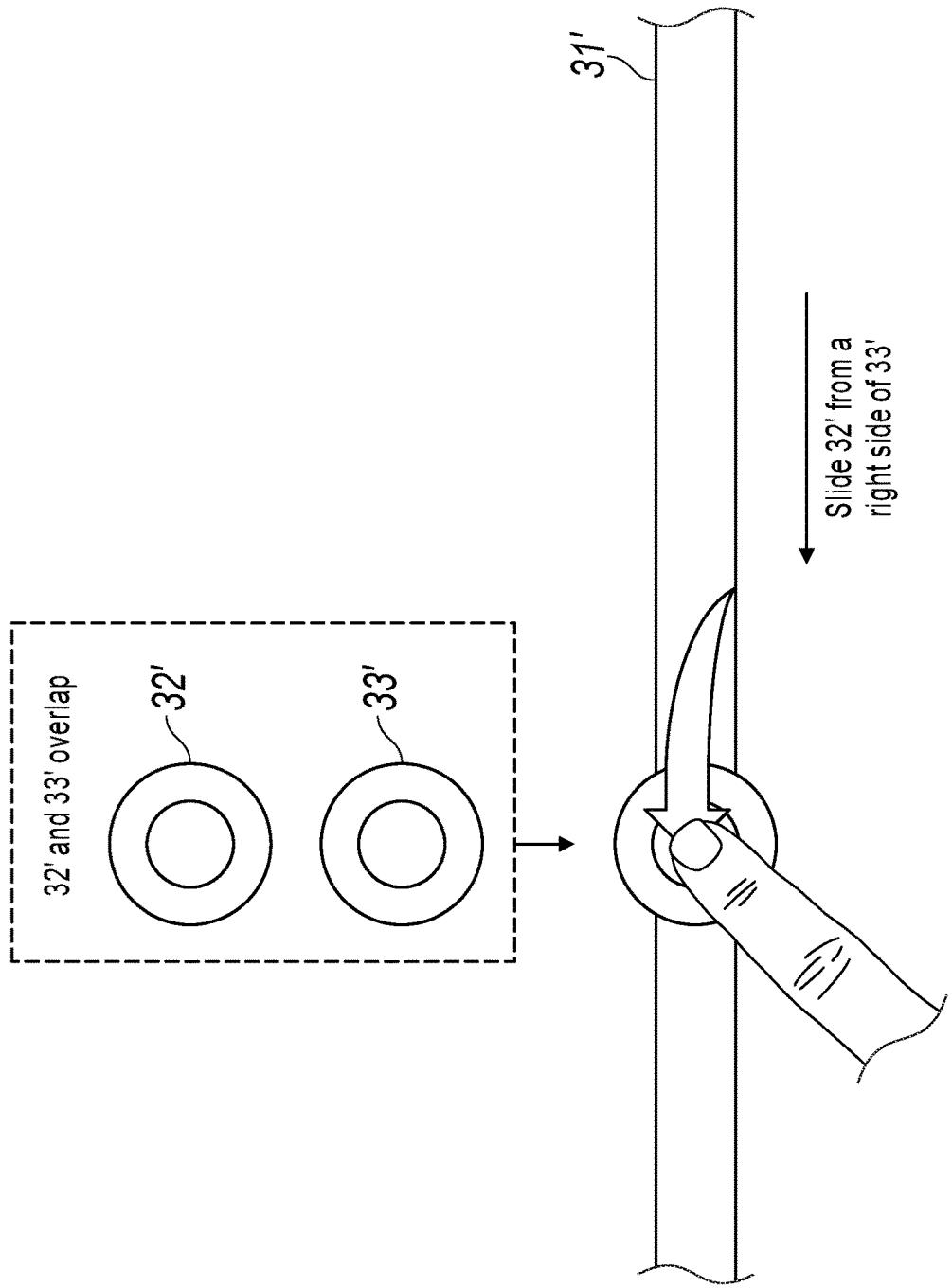
FIG. 5b is a schematic diagram illustrating a second state corresponding to a controlling procedure of a slider control, according to the existing technology.
Figure 5C:
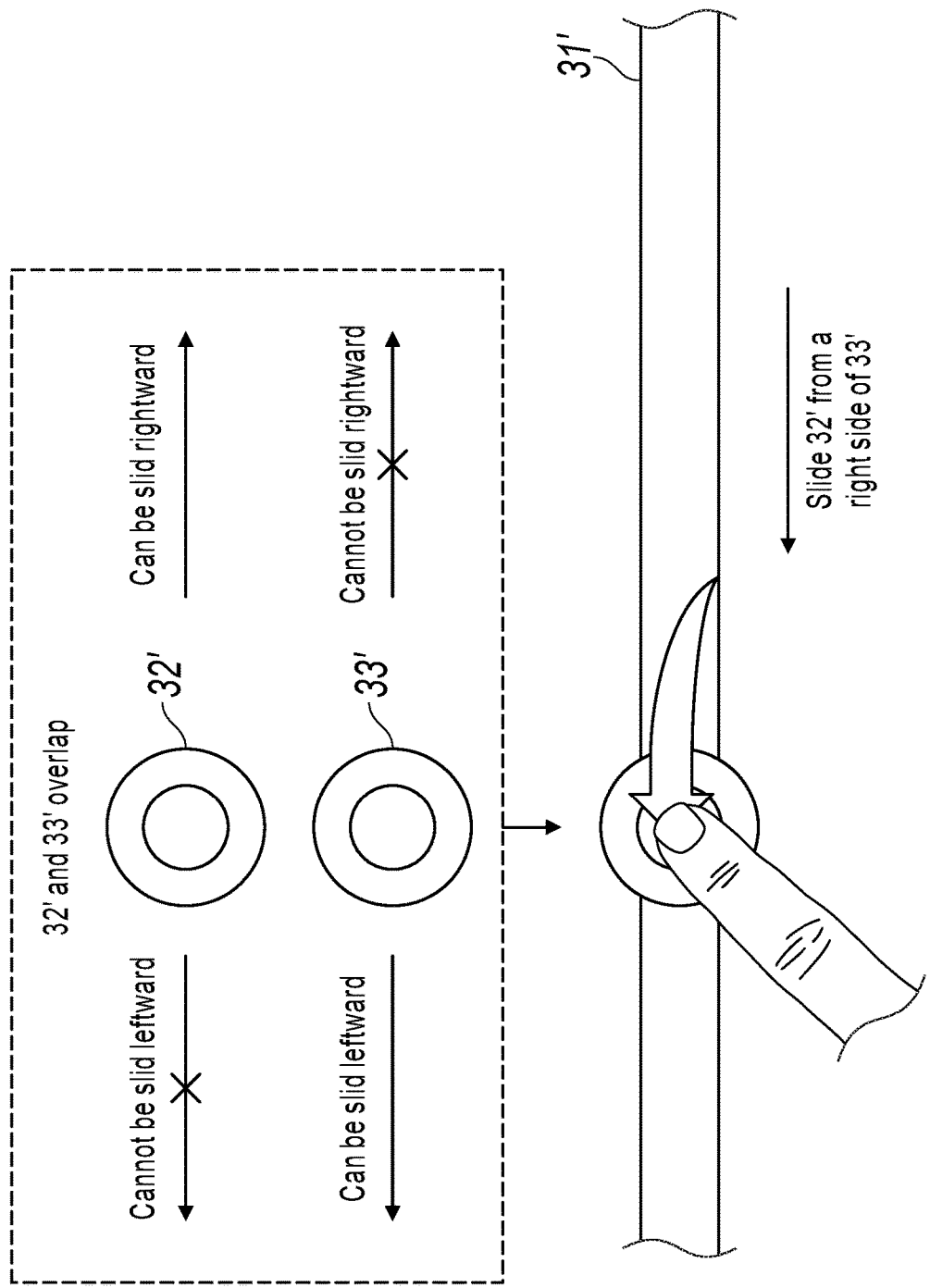
FIG. 5c is a schematic diagram illustrating a third state corresponding to a controlling procedure of a slider control, according to the existing technology.

A scenario corresponding to FIG. 5a to FIG. 5c is the scenario described in the background. In this scenario, a user wants to slide the right slider control 32' to a left side of the left slider control 33'.

FIG. 5a is a schematic diagram illustrating a first state corresponding to a controlling procedure of a slider control, according to the existing technology. In FIG. 5a, the user starts to slide the right slider control 32' leftward.

FIG. 5b is a schematic diagram illustrating a second state corresponding to a controlling procedure of a slider control, according to the existing technology. In FIG. 5b, the user has slid the right slider control 32' leftward to the location of the left slider control 33', and the right slider control 32' and the left slider control 33' overlap (that is, the right slider control 32' is located on the left slider control 33').

FIG. 5c is a schematic diagram illustrating a third state corresponding to a controlling procedure of a slider control, according to the existing technology. In FIG. 5c, limited by the existing technology, if the left slider control 33' is not moved, the user cannot continue sliding the right slider control 32' leftward. The user cannot slide the right slider control 32' to the left side of the left slider control 33'.

As described above, the solutions of the present application can be used to partially or completely resolve the problem in the existing technology. Specifically, a scenario corresponding to FIG. 6a to FIG. 6c is also the scenario described in the background.

Figure 6A:
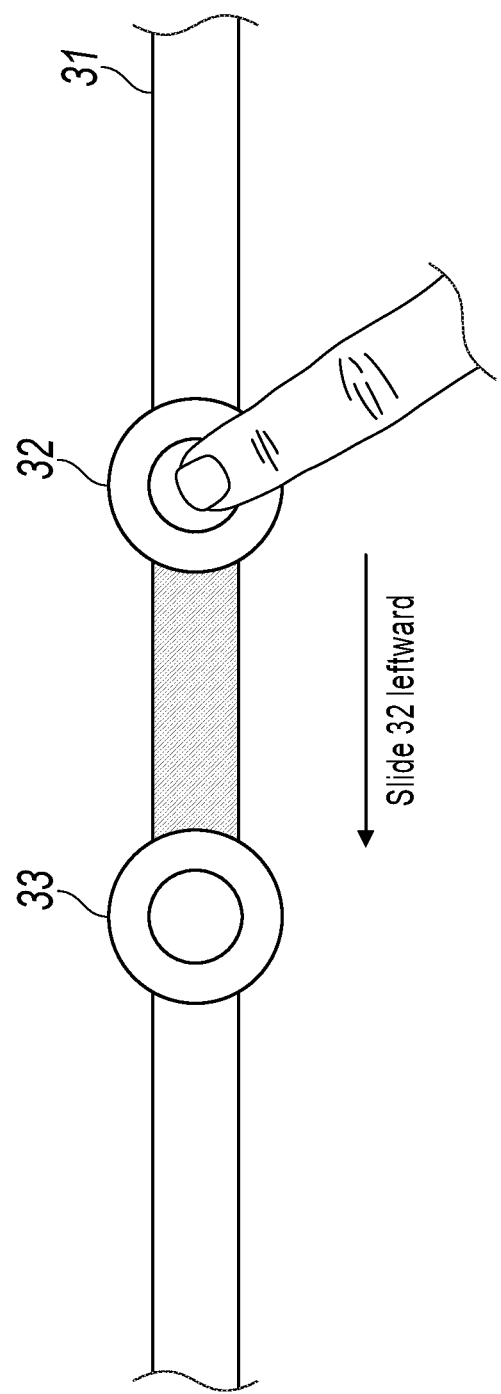
FIG. 6a is a schematic diagram illustrating a first state of a controlling procedure of a slider control, according to an implementation of the present application.

FIG. 6a is a schematic diagram illustrating a first state of a controlling procedure of a slider control, according to an implementation of the present application. In FIG. 6a, a user starts to slide a first slider control 32 leftward.

Figure 6B:
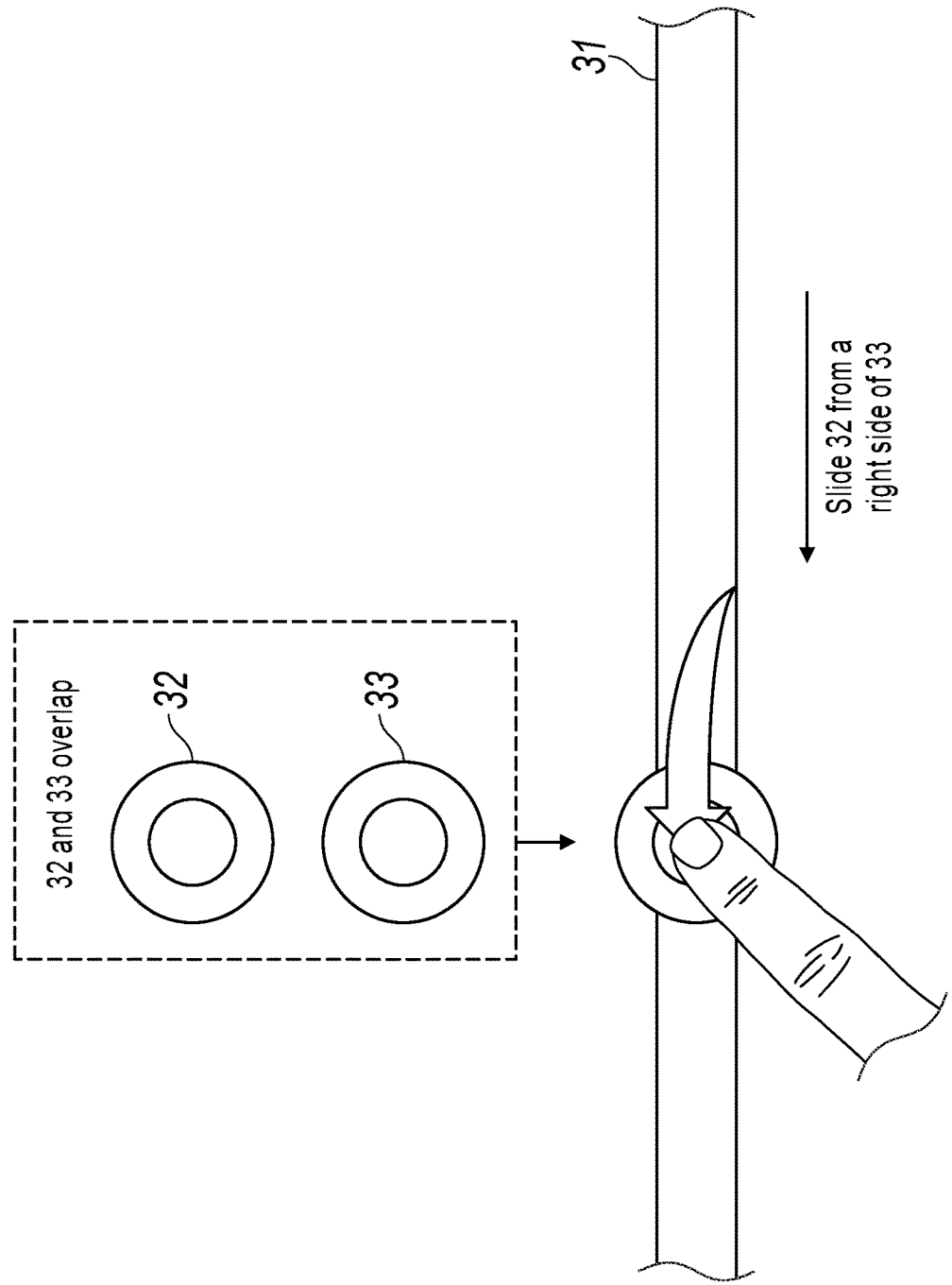
FIG. 6b is a schematic diagram illustrating a second state of a controlling procedure of a slider control, according to an implementation of the present application.

FIG. 6b is a schematic diagram illustrating a second state of a controlling procedure of a slider control, according to an implementation of the present application. In FIG. 6b, the user has slid the first slider control 32 leftward to a location of a second slider control 33, and the first slider control 32 and the second slider control 33 overlap (that is, the first slider control 32 is located on the second slider control 33).

Figure 6C:
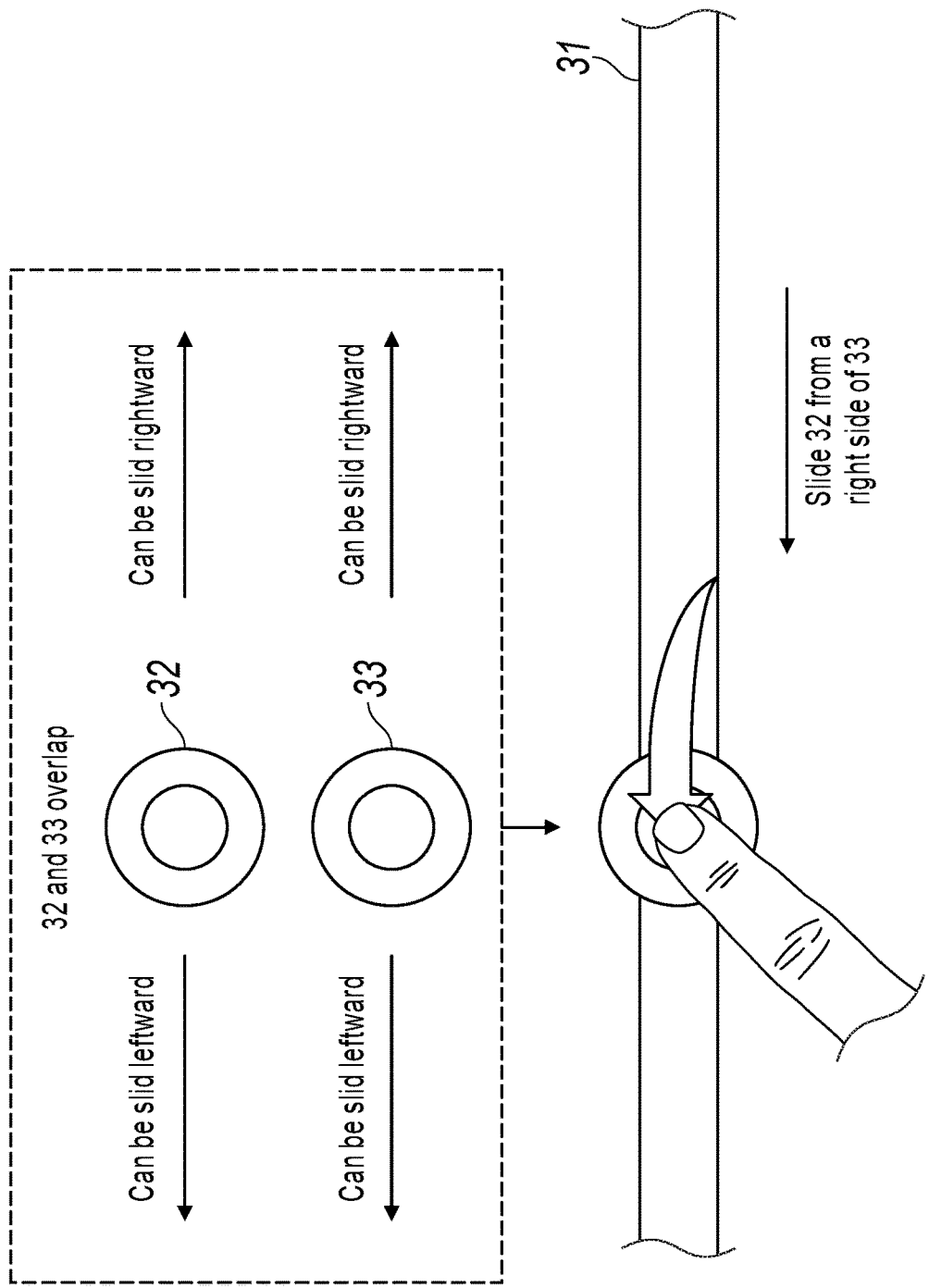
FIG. 6c is a schematic diagram illustrating a third state of a controlling procedure of a slider control, according to an implementation of the present application.

FIG. 6c is a schematic diagram illustrating a third state of a controlling procedure of a slider control, according to an implementation of the present application. In FIG. 6c, based on the solutions of the present application, the second slider control 33 does not need to be moved, and the user can continue sliding the first slider control 32 leftward.

Figure 6D:
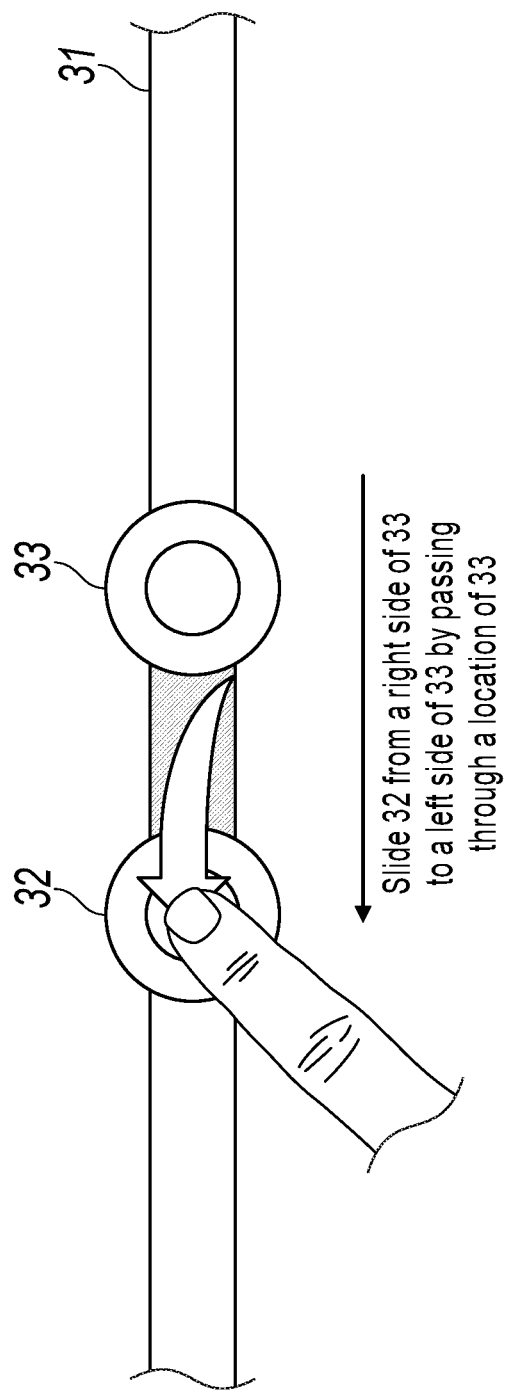
FIG. 6d is a schematic diagram illustrating a fourth state of a controlling procedure of a slider control, according to an implementation of the present application.

FIG. 6d is a schematic diagram illustrating a fourth state of a controlling procedure of a slider control, according to an implementation of the present application. In FIG. 6d, the user has slid the first slider control 32 from a right side of the second slider control 33 to the left side of the second slider control 33 by passing through the location of the second slider control 33.

As described above, in some scenarios, the solutions of the present application can be used to reduce operations of a user and improve operation experience of the user. FIG. 7a to FIG. 7g are used as an example to describe the effect in detail. In FIG. 7a to FIG. 7g, some location points are marked on a sliding track for ease of description.

Figure 7A:
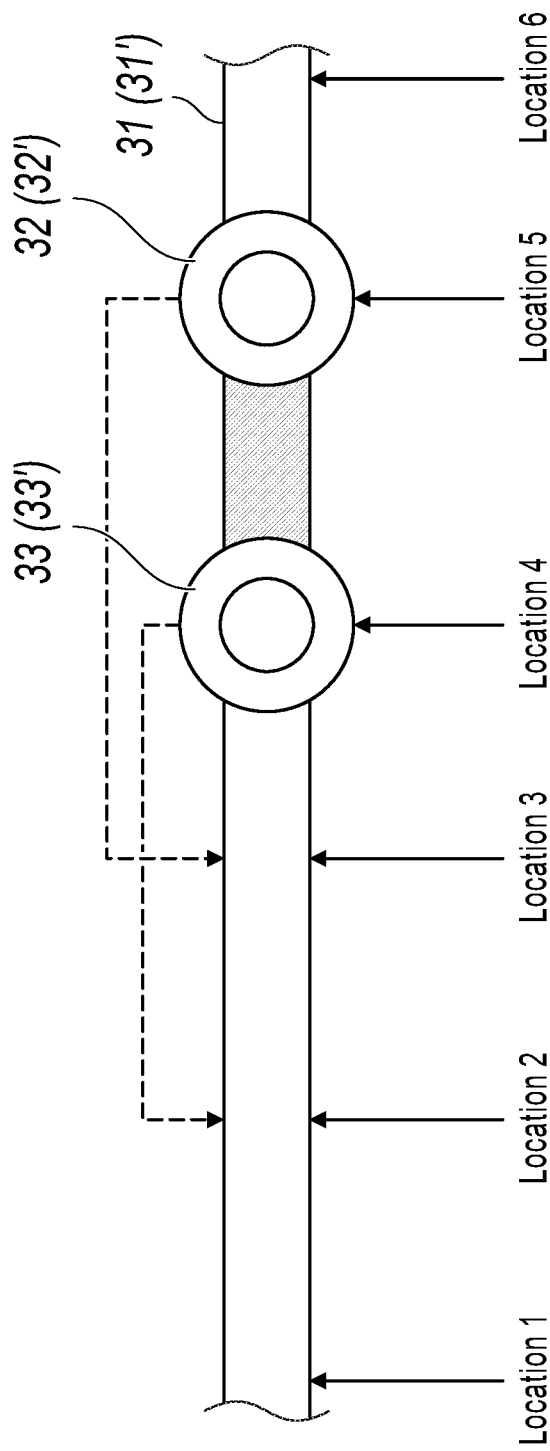
FIG. 7a is a schematic diagram illustrating a controlling scenario of a slider control in practice.

FIG. 7a is a schematic diagram illustrating a controlling scenario of a slider control in practice. Because the existing technology is going to be compared with the solutions of the present application in subsequent descriptions of FIG. 7b to FIG. 7g, a slider selector in FIG. 7a can be the slider selector in the existing technology, or can be the slider selector in the solutions of the present application. Correspondingly, labels corresponding to the solutions of the present application and labels corresponding to the existing technology are separately marked on each part in FIG. 7a.

In FIG. 7a, a slider control 32 (32') is at location 5, and a slider control 33 (33') is at location 4. Assume that a user wants to slide the slider control 32 (32') to location 3, and slide the slider control 33 (33') to location 2. Assume that the user first slides the slider control 32 (32').

Figure 7B:
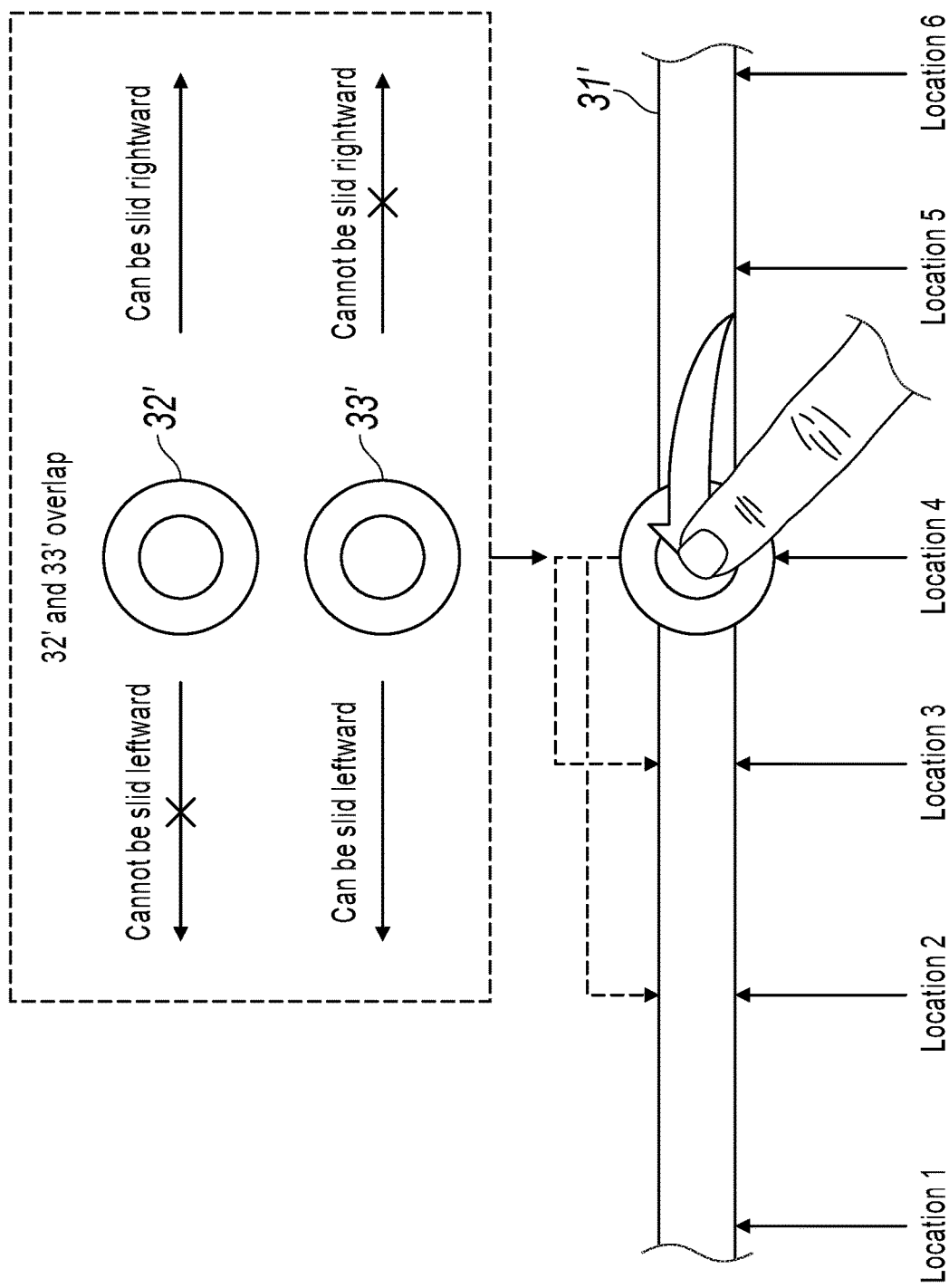
FIG. 7b is a schematic diagram illustrating a first state corresponding to a controlling procedure of a slider control for a scenario in FIG. 7a, according to the existing technology.
Figure 7C:
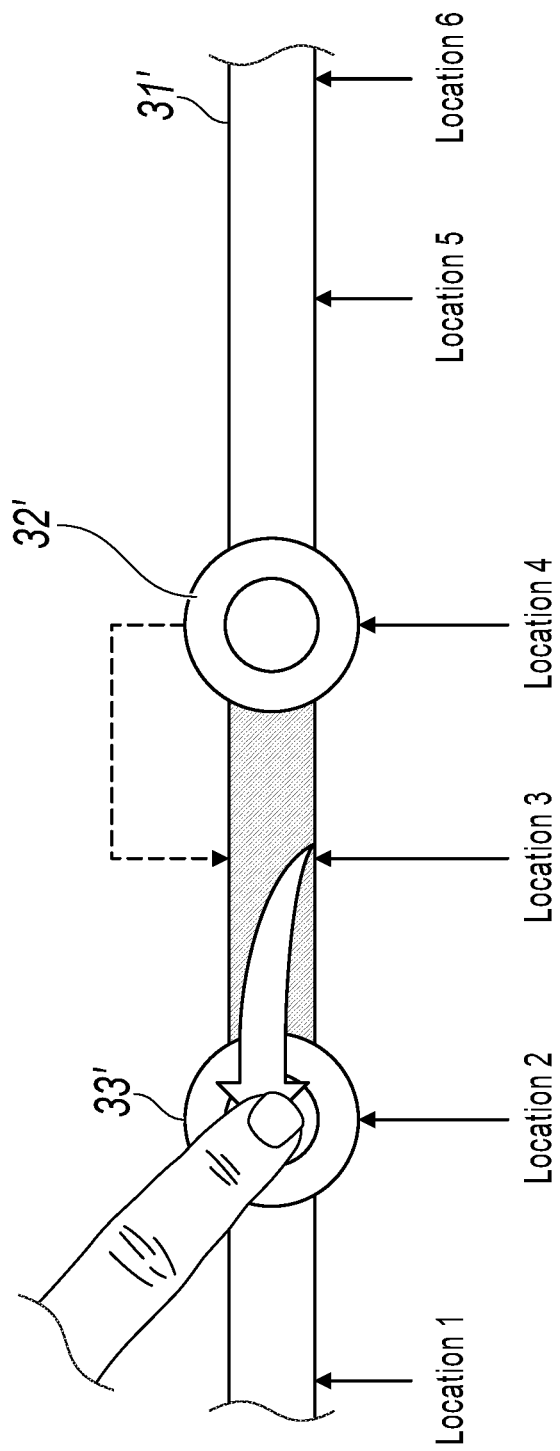
FIG. 7c is a schematic diagram illustrating a second state corresponding to a controlling procedure of a slider control for a scenario in FIG. 7a, according to the existing technology.
Figure 7D:
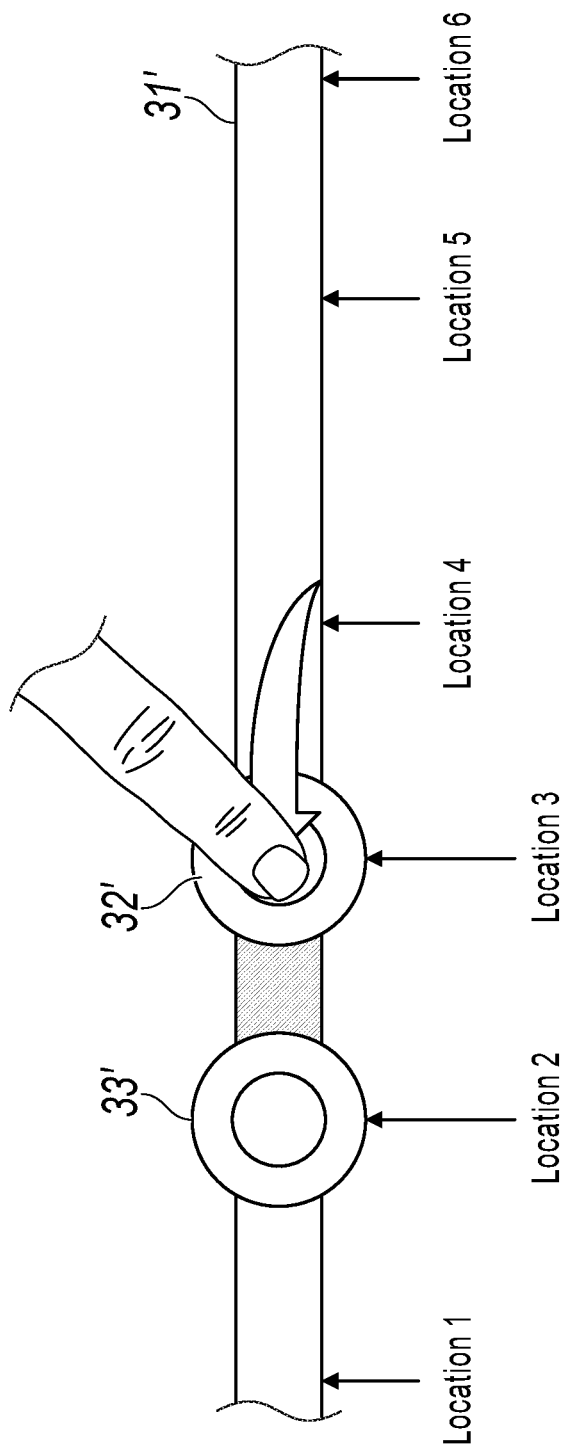
FIG. 7d is a schematic diagram illustrating a third state corresponding to a controlling procedure of a slider control for a scenario in FIG. 7a, according to the existing technology.
Figure 7E:
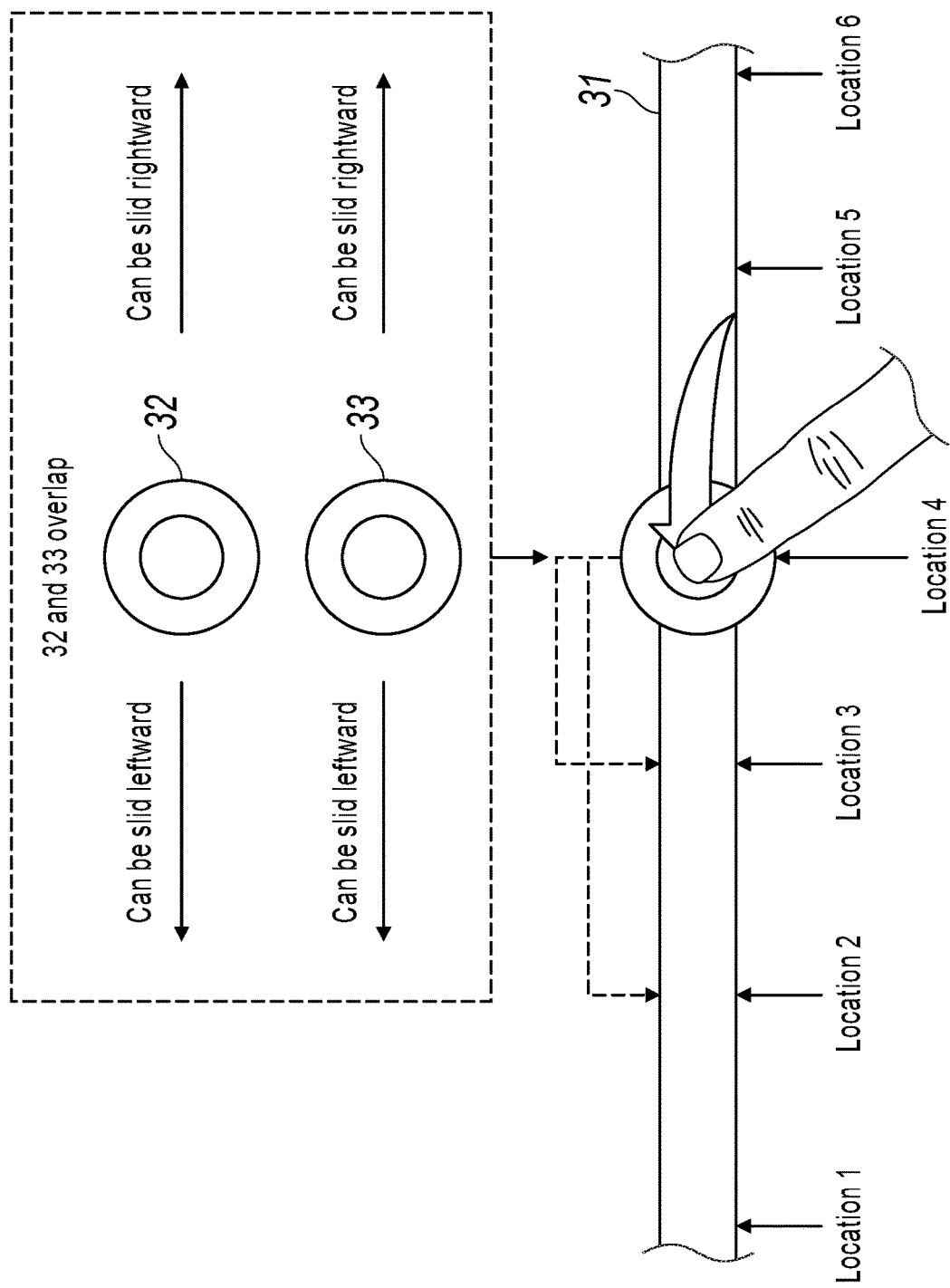
FIG. 7e is a schematic diagram illustrating a first state corresponding to a controlling procedure of a slider control for a scenario in FIG. 7a, according to an implementation of the present application.
Figure 7F:
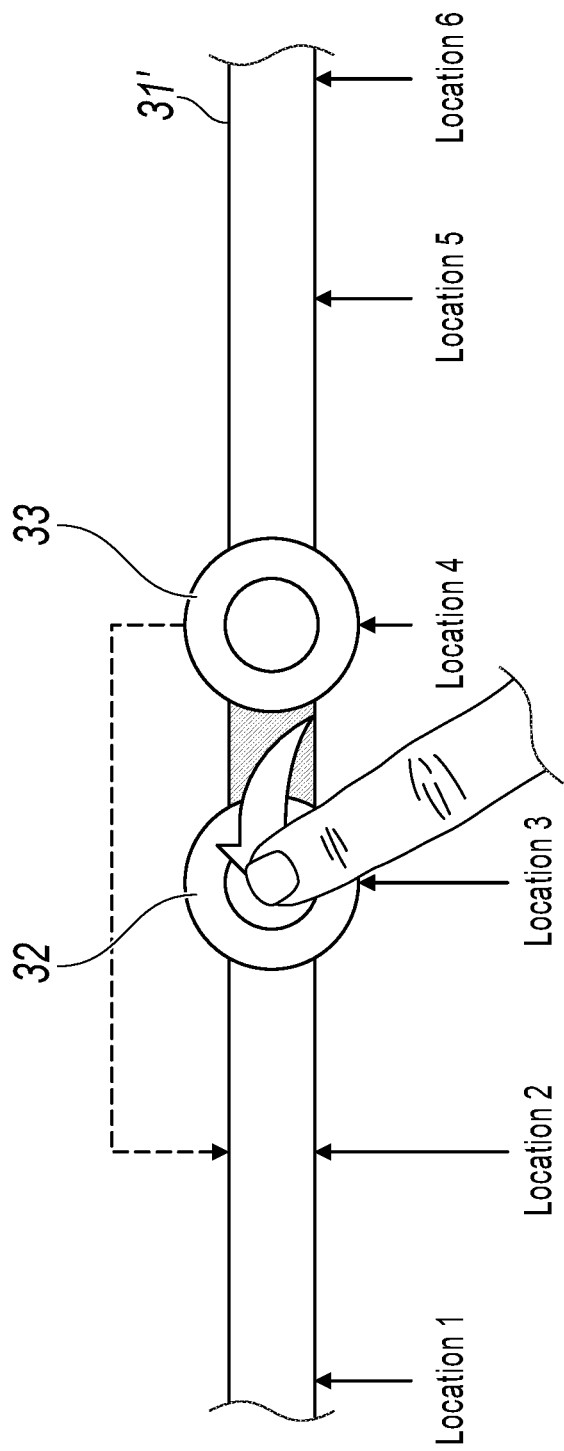
FIG. 7f is a schematic diagram illustrating a second state corresponding to a controlling procedure of a slider control for a scenario in FIG. 7a, according to an implementation of the present application.
Figure 7G:
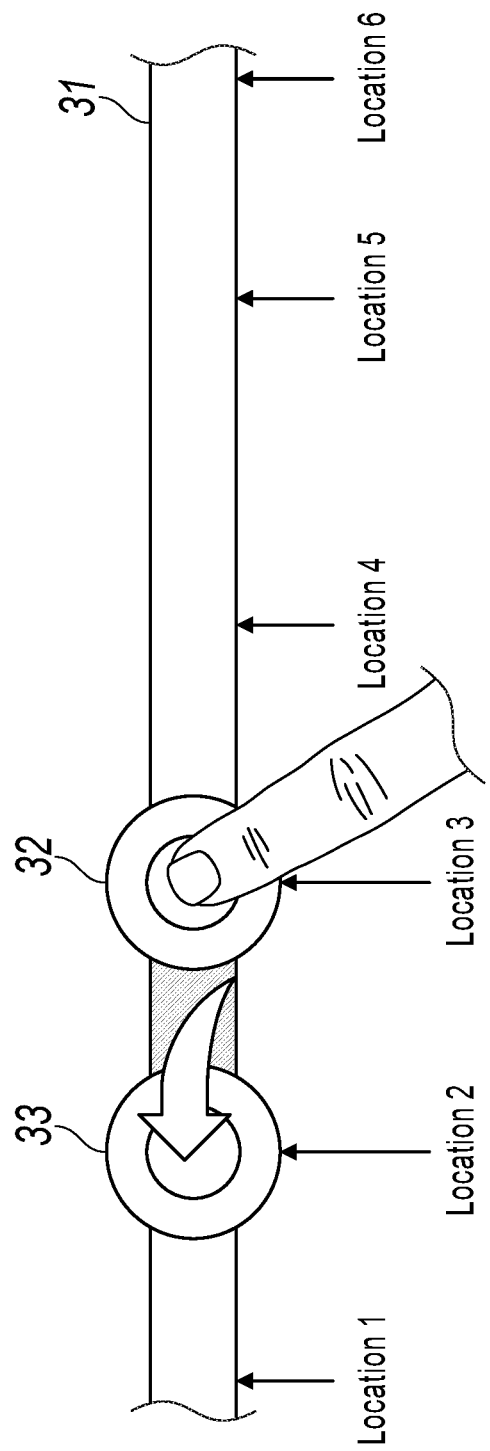
FIG. 7g is a schematic diagram illustrating a third state corresponding to a controlling procedure of a slider control for a scenario in FIG. 7a, according to an implementation of the present application.

FIG. 7b to FIG. 7d correspond to the existing technology. FIG. 7e to FIG. 7g correspond to the solutions of the present application.

FIG. 7b is a schematic diagram illustrating a first state corresponding to a controlling procedure of a slider control for the scenario in FIG. 7a, according to the existing technology. In FIG. 7b, the user has slid the right slider control 32' leftward to the location of the left slider control 33' (that is, the location 4), and the right slider control 32' and the left slider control 33' overlap. However, limited by the existing technology, if the left slider control 33' is not moved, the user cannot continue sliding the right slider control 32' leftward. The user cannot slide the right slider control 32' to a left side of the left slider control 33'.

FIG. 7c is a schematic diagram illustrating a second state corresponding to a controlling procedure of a slider control for the scenario in FIG. 7a, according to the existing technology. In FIG. 7c, because the user cannot continue sliding the right slider control 32' leftward, an operation process is interrupted, and the user can only first slide the left slider control 33' leftward to a target location (that is, the location 2).

FIG. 7d is a schematic diagram illustrating a third state corresponding to a controlling procedure of a slider control for the scenario in FIG. 7a, according to the existing technology. In FIG. 7d, because the left slider control 33' has been slid leftward, the user can start to slide the right slider control 32' leftward again, until the right slider control 32' is slid to a target location (that is, the location 3).

So far, both the right slider control 32' and the left slider control 33' have been slid to the target locations. In a whole process of FIG. 7b to FIG. 7d, the operation process of the user is forced to be interrupted, and the user needs to perform three continuous operations in total.

For the scenario in FIG. 7a, the existing technology has been analyzed, and the solutions of the present application continue to be analyzed below.

FIG. 7e is a schematic diagram illustrating a first state corresponding to a controlling procedure of a slider control for the scenario in FIG. 7a, according to an implementation of the present application. In FIG. 7e, the user has slid the first slider control 32 leftward to the location of the second slider control 33 (that is, the location 4), and the first slider control 32 and the second slider control 33 overlap.

FIG. 7f is a schematic diagram illustrating a second state corresponding to a controlling procedure of a slider control for the scenario in FIG. 7a, according to an implementation of the present application. In FIG. 7f, based on the solutions of the present application, an operation process can be uninterrupted. Even if the second slider control 33 is not moved, the user can still continue to slide the first slider control 32 leftward, until the first slider control 32 is slid to a target location (that is, the location 3).

FIG. 7g is a schematic diagram illustrating a third state corresponding to a controlling procedure of a slider control for the scenario in FIG. 7a, according to an implementation of the present application. In FIG. 7g, similar to processes in FIG. 7e and FIG. 7f, the user can slide the second slider control 33 from the location 4 to a target location (that is, the location 2) by passing through a current location of the first slider control 32 (that is, the location 3).

So far, both the first slider control 32 and the second slider control 33 have been slid to the target locations. In a whole process of FIG. 7e to FIG. 7f, the operation process of the user is not forcibly interrupted, and the user needs to perform only two continuous operations in total, which is less than a corresponding quantity of continuous operations in the existing technology.

Based on the previous analysis, a difference between operation effects of the solutions of the present application and the existing technology can be seen, and the solutions of the present application can be used to partially or completely resolve the problem in the existing technology. In a corresponding scenario such as the scenario in FIG. 7a, compared with the existing technology, the solutions of the present application can be used to reduce operations of a user and improve operation experience of the user.

The solutions of the present application are described above by mainly using an example that the slider control is used as a sliding control. For another sliding control (for example, a sliding handle control configured to select a page element displayed on a page on which the sliding handle control is located), similar operation effects can be obtained when the solutions of the present application are used. Details are omitted here.

A person skilled in the art should understand that the implementations of the present invention can be provided as a method, a system, or a computer program product. Therefore, the present invention can use a form of hardware only implementations, software only implementations, or implementations with a combination of software and hardware. Moreover, the present invention can use a form of a computer program product that is implemented on one or more computer-usable storage media (including but not limited to a disk memory, a CD-ROM, an optical memory, etc.) that include computer-usable program code.

The present invention is described with reference to the flowcharts and/or block diagrams of the method, the device (system), and the computer program product based on the implementations of the present invention. It should be understood that computer program indications can be used to implement each process and/or each block in the flowcharts and/or the block diagrams and a combination of a process and/or a block in the flowcharts and/or the block diagrams. These computer program indications can be provided for a general-purpose computer, a dedicated computer, an embedded processor, or a processor of any other programmable data processing device to generate a machine, so that the indications executed by a computer or a processor of any other programmable data processing device generate an apparatus for implementing a specific function in one or more processes in the flowcharts and/or in one or more blocks in the block diagrams.

These computer program instructions can be stored in a computer readable memory that can instruct the computer or any other programmable data processing device to work in a specific way, so that the indications stored in the computer readable memory generate an artifact that includes an indication apparatus. The indication apparatus implements a specific function in one or more processes in the flowcharts and/or in one or more blocks in the block diagrams.

These computer program indications can be loaded onto a computer or another programmable data processing device, so that a series of operations and steps are performed on the computer or the other programmable device, thereby generating computer-implemented processing. Therefore, the indications executed on the computer or another programmable device provide steps for implementing a specific function in one or more processes in the flowcharts and/or in one or more blocks in the block diagrams.

In a typical configuration, a computing device includes one or more processors (CPU), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. An example of a computer storage medium includes but is not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, tape and disk storage or another magnetic storage device or any other non-transmission media that can be used to store information that a computing device can access. According to the definition in this specification, the computer readable medium does not include a transitory computer readable medium (transitory media), for example, a modulated data signal and a carrier.

It should be further noted that, the terms "include", "comprise", or their any other variant are intended to cover a non-exclusive inclusion, so that a process, a method, an article, or a device that includes a list of elements not only includes those elements but also includes other elements which are not expressly listed, or further includes elements inherent to such process, method, article, or device. An element preceded by "includes a . . . " does not, without more constraints, preclude the presence of additional identical elements in the process, method, article, or device that includes the element.

The previous descriptions are merely implementations of the present application, and are not intended to limit the present application. For a person skilled in the art, the present application can have various alternatives. Any modification, equivalent replacement, or improvement without departing from the spirit and principle of the present application shall fall within the scope of the claims of the present application.

Figure 8:
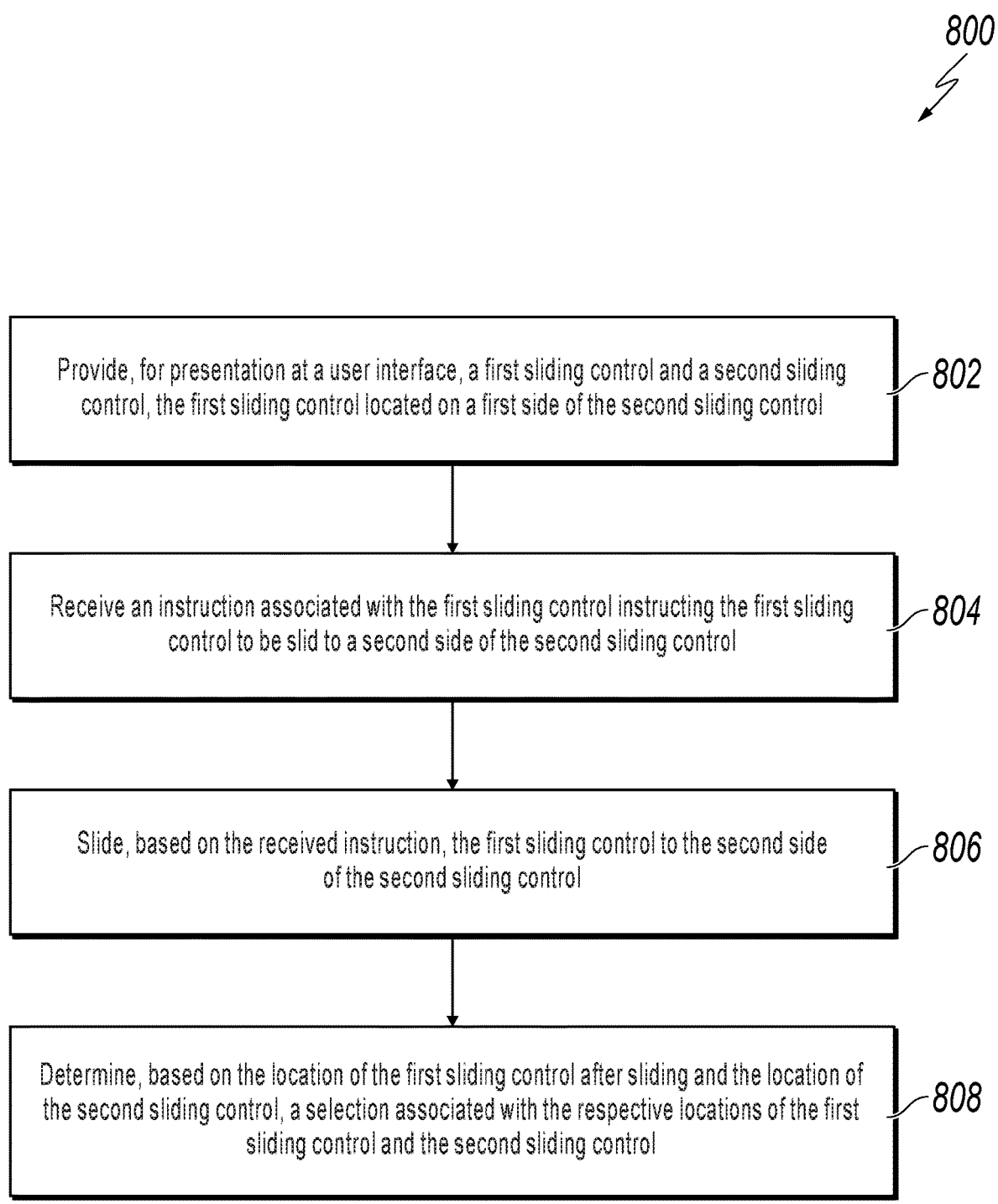
FIG. 8 is a flowchart illustrating an example of a computer-implemented method for a sliding control, according to an implementation of the present disclosure.

FIG. 8 is a flowchart illustrating an example of a computer-implemented method 800 for controlling a sliding control, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 802, a first sliding control and a second sliding control are provided for presentation, such as at a user interface. The first sliding control can be located on a first side of the second sliding control initially, or at any point. The first side and the second side of the second sliding control may be any suitable side of a presentation. In some instances, the first sliding control and the second sliding control may be located on a single sliding track, although any suitable configuration may be possible. Where the first sliding control and the second sliding control are be located on a single sliding track, the first side of the second sliding control can be a portion of the sliding track on one side of the second control, while the second side of the second sliding control can be a portion of the sliding track on the other, or opposite side of the second sliding control. From 802, method 800 proceeds to 804.

At 804, an instruction associated with the first sliding control is received, where the instruction instructs the first sliding control to be slid to a second side of the second sliding control. The instruction may be received, for example, via a drag operation received via the user interface, or may be an automated instruction such as those used in testing. The drag operation may be a touch-based or touch-related input using a touchscreen, or the drag operation may be received via another peripheral, such as a mouse or other input device. From 804, method 800 proceeds to 806.

At 806, the first sliding control is slid to the second side of the second sliding control based on the received instruction. In some instances, sliding the first sliding control to the second side of the second sliding control may be performed by moving the first sliding control through a location at which the second sliding control is located. Alternatively, or instead, sliding the first sliding control to the second side of the second sliding control may be performed by bypassing, or skipping over or around, a location at which the second sliding control is located. Sliding the first sliding control can cause the presentation to update with a new location of where the first sliding control ends after or based on the instruction. From 806, method 800 proceeds to 808.

At 808, a determination can be made, based on the location of the first sliding control after its sliding and the location of the second sliding control, a particular selection associated with the respective locations of the controls. In some instances, where the controls are on a sliding track for example, the sliding track may be used to specify a value interval. The particular locations of the first and second sliding controls can be used to select a value subinterval from the value interval.

In some instances, the first sliding control and the second sliding control are slider controls. In some instances, the first and second sliding controls may be sliding handle controls used to select a page element displayed on a page in which the first and second sliding controls are located. Based on the location of the sliding controls, a particular page element to be selected is determined. After 808, method 800 can stop.

The present solution can provide a better user experience, as user inputs and interactions can be reduced by allowing controls to be moved to any location on a slider. In some instances, the operation allows for a reduction in sliding distances of the first sliding control, thus reducing operation time. For example, the first sliding control can be straight slid (in a shortest sliding distance) from one side of the second sliding control to the other side of the second sliding control, using a straight direct line between the first sliding control and the second sliding control and an extended line of the straight line as a sliding track of the first sliding track.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    receiving an instruction associated with a first sliding control, the first sliding control located on a first side of a second sliding control, wherein the received instruction instructs the first sliding control to be slid to a second side of the second sliding control; and
    sliding the first sliding control to the second side of the second sliding control in response to receiving the instruction, wherein sliding the first sliding control to the second side of the second sliding control comprises sliding the first sliding control to the second side of the second sliding control by moving the first sliding control through a location at which the second sliding control is located while preventing the first sliding control from overlapping with the second sliding control.

2. The computer-implemented method of claim 1, wherein the instruction is received in response to a drag operation performed on the first sliding control.

3. The computer-implemented method of claim 1, wherein the first sliding control and the second sliding control are located on a single sliding track.

4. The computer-implemented method of claim 3, wherein the first side of the second sliding control comprises a portion of the sliding track on one side of the second sliding control and the second side of the second sliding control comprises a portion of the sliding track on the other side of the second sliding control.

5. The computer-implemented method of claim 4, wherein the sliding track is configured to specify a value interval, wherein the first sliding control and the second sliding control are configured to select a value subinterval from the value interval.

6. The computer-implemented method of claim 5, further comprising, after sliding the first sliding control to the second side of the second sliding control, determining, based on a location of the first sliding control on the sliding track and the location of the second sliding control on the sliding track, the value subinterval selected from the value interval.

7. The computer-implemented method of claim 1, wherein the first sliding control and the second sliding control are slider controls.

8. The computer-implemented method of claim 1, wherein the first sliding control and the second sliding control are sliding handle controls configured to select a page element displayed on a page on which the first sliding control and the second sliding control are located, the method further comprising, after sliding the first sliding control to the second side of the second sliding control, determining, based on a location of the first sliding control obtained after sliding and the location of the second sliding control, the page element selected.

9. The computer-implemented method of claim 1, wherein a location of the second sliding control is non-limiting to the available locations to which the first sliding control can be moved.

10. A non-transitory computer-readable medium storing one or more instructions executable by a computer system to perform operations comprising:
receiving an instruction associated with a first sliding control, the first sliding control located on a first side of a second sliding control, wherein the received instruction instructs the first sliding control to be slid to a second side of the second sliding control; and
sliding the first sliding control to the second side of the second sliding control in response to receiving the instruction, wherein sliding the first sliding control to the second side of the second sliding control comprises sliding the first sliding control to the second side of the second sliding control by moving the first sliding control through a location at which the second sliding control is located while preventing the first sliding control from overlapping with the second sliding control.

11. The non-transitory computer-readable medium of claim 10, wherein the instruction is received in response to a drag operation performed on the first sliding control.

12. The non-transitory computer-readable medium of claim 10, wherein the first sliding control and the second sliding control are located on a single sliding track, and wherein the first side of the second sliding control comprises a portion of the sliding track on one side of the second sliding control and the second side of the second sliding control comprises a portion of the sliding track on the other side of the second sliding control.

13. The non-transitory computer-readable medium of claim 12, wherein the sliding track is configured to specify a value interval, wherein the first sliding control and the second sliding control are configured to select a value subinterval from the value interval.

14. The non-transitory computer-readable medium of claim 13, further comprising, after sliding the first sliding control to the second side of the second sliding control, determining, based on a location of the first sliding control on the sliding track and the location of the second sliding control on the sliding track, the value subinterval selected from the value interval.

15. The non-transitory computer-readable medium of claim 10, wherein the first sliding control and the second sliding control are sliding handle controls configured to select a page element displayed on a page on which the first sliding control and the second sliding control are located, the operations further comprising, after sliding the first sliding control to the second side of the second sliding control, determining, based on a location of the first sliding control obtained after sliding and the location of the second sliding control, the page element selected.

16. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving an instruction associated with a first sliding control, the first sliding control located on a first side of a second sliding control, wherein the received instruction instructs the first sliding control to be slid to a second side of the second sliding control; and
sliding the first sliding control to the second side of the second sliding control in response to receiving the instruction, wherein sliding the first sliding control to the second side of the second sliding control comprises sliding the first sliding control to the second side of the second sliding control by moving the first sliding control through a location at which the second sliding control is located while preventing the first sliding control from overlapping with the second sliding control.

17. The computer-implemented system of claim 16, wherein the first sliding control and the second sliding control are located on a single sliding track.

18. The computer-implemented system of claim 17, wherein the first side of the second sliding control comprises a portion of the sliding track on one side of the second sliding control and the second side of the second sliding control comprises a portion of the sliding track on the other side of the second sliding control.

19. The computer-implemented system of claim 18, wherein the sliding track is configured to specify a value interval, wherein the first sliding control and the second sliding control are configured to select a value subinterval from the value interval.

20. The computer-implemented system of claim 19, wherein the operations further comprise, after sliding the first sliding control to the second side of the second sliding control, determining, based on a location of the first sliding control on the sliding track and the location of the second sliding control on the sliding track, the value subinterval selected from the value interval.

21. The computer-implemented system of claim 16, wherein the first sliding control and the second sliding control are sliding handle controls configured to select a page element displayed on a page on which the first sliding control and the second sliding control are located, the operations further comprising, after sliding the first sliding control to the second side of the second sliding control, determining, based on a location of the first sliding control obtained after sliding and the location of the second sliding control, the page element selected.

* * * * *